March 17, 1959 — J. J. HARLEY ET AL — 2,877,720
RAILWAY VEHICLE TRUCK

Filed Nov. 23, 1953 — 3 Sheets-Sheet 1

INVENTORS
Joseph J. Harley
James B. Cunningham
By Rodney Bedell
atty.

March 17, 1959  J. J. HARLEY ET AL  2,877,720
RAILWAY VEHICLE TRUCK

Filed Nov. 23, 1953  3 Sheets-Sheet 2

INVENTORS
Joseph J. Harley
James B. Cunningham
By Rodney Bedell
Atty.

March 17, 1959     J. J. HARLEY ET AL     2,877,720
RAILWAY VEHICLE TRUCK
Filed Nov. 23, 1953     3 Sheets-Sheet 3
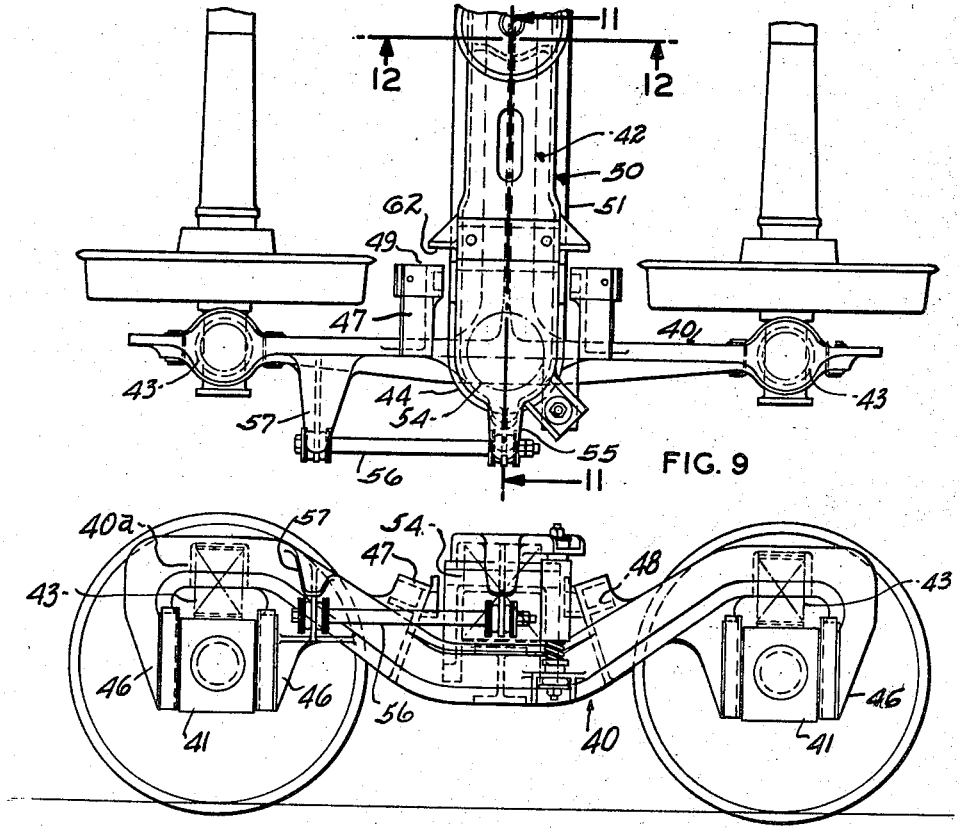
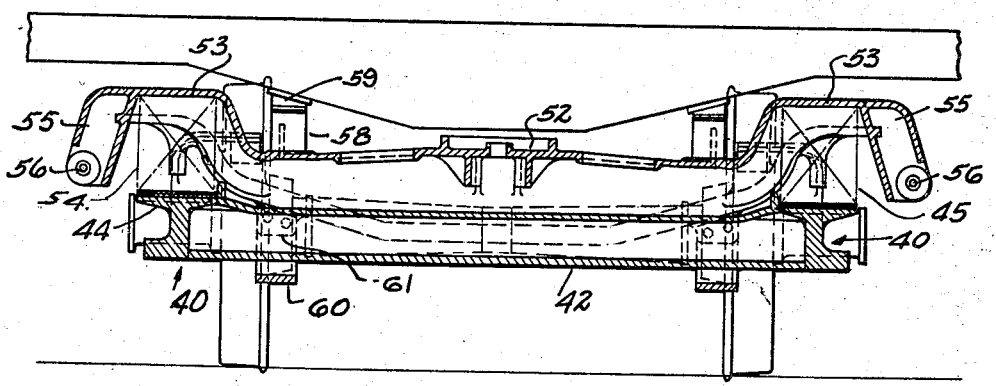
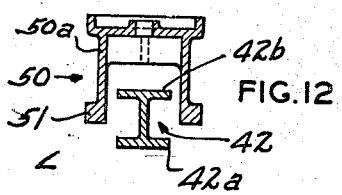
INVENTORS
Joseph J. Harley
James B Cunningham
By Rodney Bedell
atty.

United States Patent Office 2,877,720
Patented Mar. 17, 1959

2,877,720

RAILWAY VEHICLE TRUCK

Joseph J. Harley, Granite City, Ill., and James B. Cunningham, St. Louis, Mo., assignors to General Steel Castings Corporation, Granite City, Ill., a corporation of Delaware Application November 23, 1953, Serial No. 393,756

6 Claims. (Cl. 105—197)

The invention relates to railway rolling stock and more particularly to four wheel trucks adapted for high speed service in which a double set of springs are provided between the truck wheel and axle assemblies and the load-carrying truck bolster.

The main objects of the invention are to simplify the truck structure, and particularly the truck frame; to reduce truck maintenance expense; to lower the center of gravity of the truck and its load; and to produce an easy riding truck.

Figure 1:
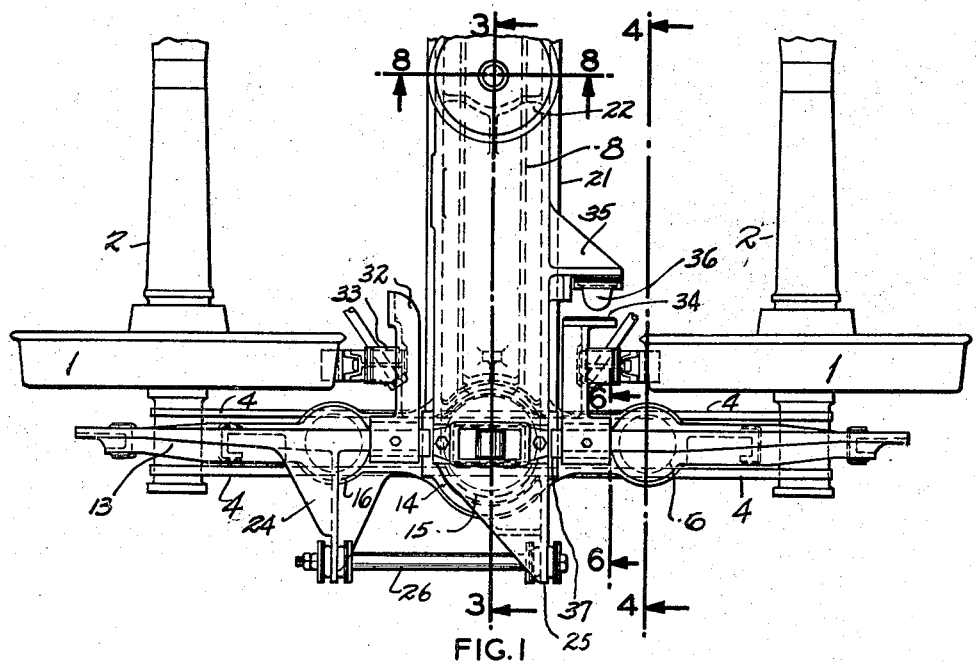
Figure 1 is a top view of one longitudinal half of a four wheel truck embodying one form of the invention.
Figure 2:
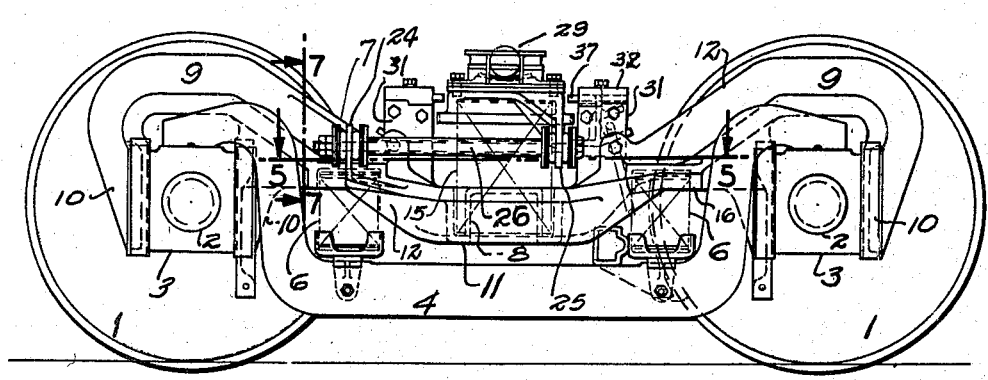
Figure 2 is a side elevation of the structure shown in Figure 1.
Figure 5:
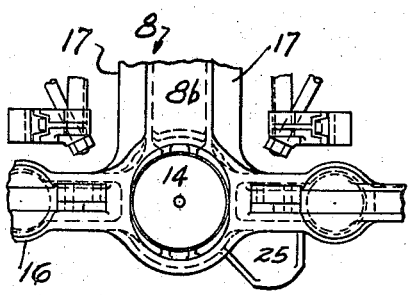
Figure 5 is a detail top view taken on line 5—5 of Figure 2 with the bolster removed.
Figure 3:
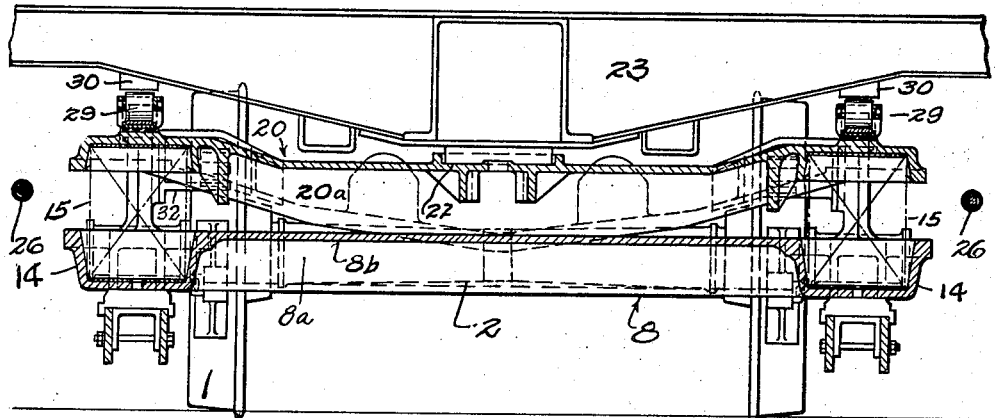
Figure 3 is a vertical transverse section taken on line 3—3 of Figure 1.
Figure 4:
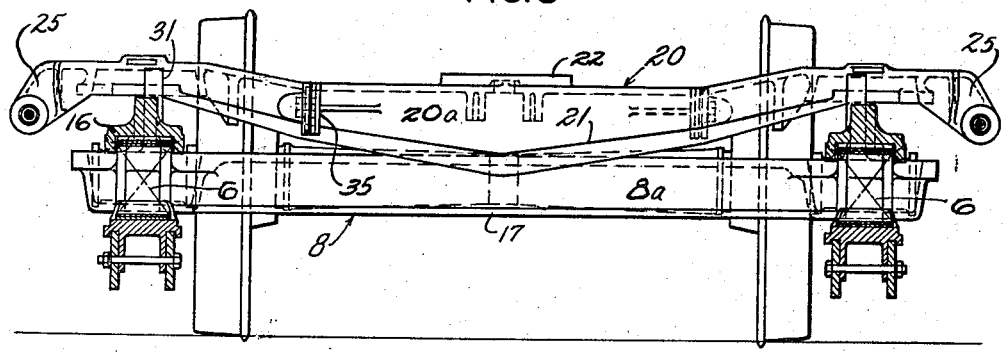
Figure 4 is a vertical transverse section taken on line 4—4 of Figure 1. Some parts are omitted for clarification.
Figure 7:
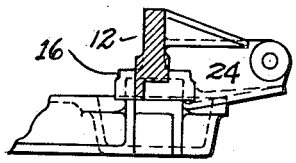
Figure 7 is a detail vertical transverse section taken on line 7—7 of Figure 2.

Figure 9 corresponds to Figure 1 but shows another form of the invention.

Figure 10 is a side view of the structure shown in Figure 9.

Figure 11 is a vertical transverse section taken on line 11—11 of Figure 9.

Figure 12 is a detail vertical longitudinal section taken on line 12—12 of Figure 9.

The truck shown in Figures 1-8 includes the usual assemblies of wheels 1, axles 2, and journal boxes 3. Drop equalizers 4 extend between and are supported by journal boxes 3 and preferably are arranged in pairs at each side of the truck. Equalizer coil springs 6 are supported on equalizers 4.

The truck frame consists of a one piece casting comprising side members 7 and a transverse transom 8. Each side member 7 has relatively elevated end portions 9 with depending legs 10 forming pedestals slidably receiving journal boxes 3. The middle portions 11 of the side frames are at a substantially lower level approximating the level of axles 2. Inclined portions 12 connect end portions 9 and middle portions 11.

Each side member, throughout most of its length, consists of a relatively narrow and deep slab or web, but its cross section is modified over the journal box to include lower flanges 13 providing better resistance against lateral distortion; is modified at the middle of the frame to form a U section spring seat 14 (Fig. 3) opening upwardly to receive the bolster spring 15; and is modified at the inclined portions 12 to form downwardly facing concave spring seats 16 (Figures 1 and 4) to receive the upper ends of equalizer springs 6. Transom 8 is of inverted U shape in cross section (Fig. 8) with outturned reinforcing flanges 17 at the lower ends of its upright legs 8a. The ends of upright legs 8a merge with the walls of bolster spring seats 14 and flanges 17 merge with the bottom web of spring seats 14.

Mounted on springs 15 is a load-carrying bolster 20 of inverted U section (Figure 8) with its upright legs 20a reinforced by ribs 21 and straddling transom 8 and extending downwardly below the level of the top horizontal web 8b of the transom. The intermediate portion of bolster 20 includes a central bearing 22 upon which the vehicle body 23 is mounted.

Brackets 24 on the side frames and 25 on the bolster (Figures 1, 6, 7) are connected by an anchor 26 in a well-known manner to hold the bolster and truck frame against substantial movement longitudinally of the truck.

The bolster mounts side bearings 29 immediately over the bolster springs 15 and the vehicle body includes cooperating side bearing elements 30. The side bearings may be mounted as shown because of the low level of the bolster spring seats 14 and because of the fact that the middle portions of the frame side members are wholly beneath the bolster. This arrangement provides for ready inspection and adjustment of the side bearings.

Figure 6:
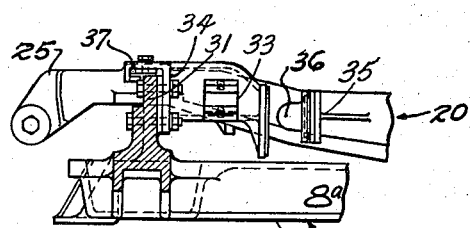
Figure 6 is a vertical transverse section taken on line 6—6 of Figure 1.
Figure 8:
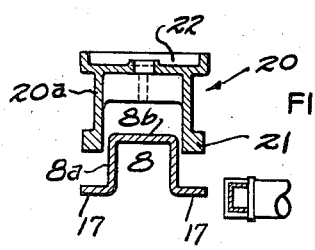
Figure 8 is a detail vertical longitudinal section taken on line 8—8 of Figure 1.

Each side frame inclined portion 12 has an upward extension 31 (Figures 2, 6) one of which mounts an inwardly projecting bracket 32 and the other of which mounts an inwardly projecting bracket 34. Each bracket is provided with a brake hanger lug 33 (Figures 1, 6). Brackets 32 are disposed diagonally of the bolster and brackets 34 are similarly disposed. The inner ends of brackets 34 facing towards the center line of the truck cooperate with brackets 35 projecting from the sides of the bolster and mount rubber bumpers 36 to limit relative lateral movement of the bolster and frame transversely of the truck. A gib type locking plate 37 is secured to the underside of bracket 32 and extends over bolster rib 21 and comprises a safety device preventing the accidental removal of the bolster from the truck frame.

Figures 9, 10, and 11 illustrate another form of the invention in which the truck frame is a one piece casting with the ends of its side members 40 directly spring supported upon the journal boxes 41, the intermediate portions of the side members being at a substantially lower level than the ends and connected by a single transverse transom 42. The side members are L shape in cross section throughout the major portion of their length with their ends enlarged to form downwardly opening recesses 40a for receiving the truck springs 43 seated on the journal boxes and the middle portions of the side members are flanged at 44 to form seats for the bolster springs 45, 54. The ends of the side members form pedestal legs 46 for slidably receiving journal boxes 41.

The middle transom 42 is of I shape in cross section with its lower flanges 42a merging with the horizontal legs of side members 40 and its upper flanges 42b merging with spring seat flanges 44 of side members 40.

Brake hanger brackets 47 are formed integral with the frame side members 40 and project inwardly therefrom and terminate in the hanger lugs 48 which also form inwardly facing stops 49.

The bolster 50 is of inverted U section with its upright legs 50a straddling transom 42 and enlarged at 51 similarly to the bolster previously described. The end portions of bolster 50 are offset upwardly substantially above the level of the bolster center bearing 52 and form downwardly opening spring seats 53 for bolster springs 45, 54.

The ends of the bolster include outwardly and downwardly projecting brackets 55 connected by anchor members 56 to brackets 57 projecting from side frames 40, as previously described. The truck and body side bearings 58, 59 follow the usual arrangement and are positioned inwardly from the truck wheels. The bolster and truck frame are held against accidental separation by the usual safety straps 60 with their ends secured to depending lugs 61 on the bolster and its intermediate portion passing under transom 42. The bolster includes stops 62 opposing the side frame bracket stops 49 to limit relative movement of the bolster and frame transversely of the truck as the bolster springs 45, 54 deflect laterally.

The truck of Figures 9, 10 and 11 differs principally from the truck of Figures 1-8 in that it does not require equalizers and hence is lighter, less extensive and simpler in construction, although the construction first described would comprise an easier riding truck. Both trucks are characterized by the one piece cast frame arrangement eliminating assembly and maintenance costs and preventing undesired play between the parts by the loosening up of bolted or riveted joints.

It will be understood that either form of transom could be utilized in combination with the other side frame member arrangement and that other details of the two structures may be combined as may be desired to meet different conditions. Such variations may be made without departing from the spirit of the invention as expressed in the accompanying claims.

What is claimed is:

1. A railway truck frame comprising in a one-piece casting spaced side members and a single transverse transom extending between the middle portions of the side members intermediate their ends, the side member middle portions being of U shape in cross section and positioned below the level of the end portions of the side members, the transom member being of inverted U shape in cross section substantially throughout its length but with the upright webs of its end portions merging with the inner upright webs of the side member intermediate portions, upwardly-opening cup-like spring seats being formed by the merging upright webs of said transom end portions and said side member.

2. A railway truck frame consisting of a one piece casting with spaced side frames and an integral transverse transom intermediate the ends of the side frame, the end portions of each side frame being relatively elevated and the middle portion being below the level of the end portions, there being inclined portions connecting the middle and end portions of each side frame, the end portions and inclined portions of the side frames being narrow and relatively deep in cross section and the middle portions of the side frames being of U shape in cross section and forming spring seats opening upwardly, the inclined portions having downwardly opening cup-like spring seats, and the transom having upright webs merging at the ends of the transom with the upright webs of the middle portions of the side frames.

3. In a railway truck having spaced wheel and axle assemblies and equalizers extending between and supported at their ends on said assemblies and upstanding springs having fixed seats on said equalizers near the end portions thereof, a truck frame having sides supported on said springs and including a single transverse transom member midway between the assemblies and rigid with the side members, an upstanding spring seated on said transom at each side of the truck, and a load-carrying bolster member mounted directly on said transom-seated springs, said transom directly underlying said bolster, one of said members being of U shape in cross section with a horizontal web and vertical side webs and receiving the other of said members between its vertical side webs.

4. In a railway truck having spaced wheel and axle assemblies and drop equalizers extending between said assemblies each having high level end portions supported thereon and a low level intermediate portion, upright coil springs having stationary seats on said low level intermediate portions of the equalizers, a truck frame having side members extending between said assemblies and holding them in spaced relation, each side member having elevated portions mounted on said springs and an intermediate portion of relatively low level, there being a single transom positioned midway between said assemblies and rigid with and at substantially the same level as said frame side member low level portions, upstanding springs seated directly on said truck frame at the ends of said transom, and a load-carrying bolster mounted directly on said latter mentioned springs and positioned immediately over said transom.

5. A railway truck structure according to claim 4 in which the bolster is of inverted U section having a main horizontal web and depending flanges at the sides thereof and receiving the transom between said depending flanges.

6. A railway truck structure according to claim 4 in which the frame transverse transom member is approximately at the same level as the axles and the bolster spring-supported thereon is below the level of the tops of the wheels.

References Cited in the file of this patent

UNITED STATES PATENTS

| | | |
|---|---|---|
| 757,927 | Hoy | Apr. 19, 1904 |
| 786,575 | Lipschutz | Apr. 4, 1905 |
| 833,895 | Price | Oct. 23, 1906 |
| 1,094,822 | Starbuck | Apr. 28, 1914 |
| 1,409,402 | Pflager | Mar. 14, 1922 |
| 1,586,790 | Elliott | June 1, 1926 |
| 1,994,304 | Devlin | Mar. 12, 1935 |
| 2,021,285 | Busch | Nov. 19, 1935 |
| 2,051,605 | Isaacson | Apr. 18, 1936 |
| 2,721,523 | McIntosh et al. | Oct. 25, 1955 |